United States Patent
Mu et al.

(10) Patent No.: US 10,541,796 B2
(45) Date of Patent: Jan. 21, 2020

(54) PACKETS WITH MIDAMBLES HAVING COMPRESSED OFDM SYMBOLS

(71) Applicant: Marvell World Trade Ltd., St. Michael (BB)

(72) Inventors: Hua Mu, Orlando, FL (US); Hongyuan Zhang, Fremont, CA (US); Rui Cao, Fremont, CA (US); Xiayu Zheng, San Jose, CA (US); Sergey Timofeev, Mountain View, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 16/001,648

(22) Filed: Jun. 6, 2018

(65) Prior Publication Data

US 2018/0359066 A1 Dec. 13, 2018

Related U.S. Application Data

(60) Provisional application No. 62/517,724, filed on Jun. 9, 2017.

(51) Int. Cl.
```
H04L 5/00      (2006.01)
H04L 27/26     (2006.01)
H04W 84/12     (2009.01)
```
(52) U.S. Cl.
CPC .......... *H04L 5/0044* (2013.01); *H04L 5/0007* (2013.01); *H04L 27/266* (2013.01);
(Continued)

(58) Field of Classification Search
None
See application file for complete search history.

(56) References Cited

U.S. PATENT DOCUMENTS

| 6,031,874 A | 2/2000 | Chennakeshu et al. |
| 6,397,368 B1 | 5/2002 | Yonge, III et al. |

(Continued)

FOREIGN PATENT DOCUMENTS

| EP | 1432166 A2 | 6/2004 |
| EP | 1601117 A2 | 11/2005 |

(Continued)

OTHER PUBLICATIONS

International Search Report and Written Opinion in International Patent Application No. PCT/US2018/036245, dated Sep. 11, 2018 (12 pages).

(Continued)

*Primary Examiner* — Diane L Lo

(57) ABSTRACT

A communication device generates: i) a physical layer (PHY) preamble of a PHY protocol data unit (PPDU), ii) a first portion of a PHY data payload of the PPDU, and iii) a second portion of the PHY data payload. The PHY preamble includes a first training field, and one or more second training fields. The first portion of the PHY data payload and the second portion of the PHY data payload include a plurality of first orthogonal frequency division multiplexing (OFDM) symbols. Each of multiple first OFDM symbols has a first duration. The communication device generates a PHY midamble of the PPDU to be included between the first and second portions of the PHY data payload. The PHY midamble includes one or more third training fields, each including a respective second OFDM symbol having a second duration shorter than the first duration.

17 Claims, 5 Drawing Sheets

(52) U.S. Cl.
CPC ...... *H04L 27/2607* (2013.01); *H04L 27/2628* (2013.01); *H04L 27/2692* (2013.01); *H04W 84/12* (2013.01)

(56) References Cited

U.S. PATENT DOCUMENTS

| | | | |
|---|---|---|---|
| 6,553,534 B2 | 4/2003 | Yonge, III et al. |
| 6,598,200 B1 | 7/2003 | Greenwood et al. |
| 6,975,837 B1 | 12/2005 | Santoru |
| 7,334,181 B2 | 2/2008 | Eroz et al. |
| 7,346,007 B2 | 3/2008 | Curcio et al. |
| 7,599,332 B2 | 10/2009 | Zelst et al. |
| 7,742,390 B2 | 6/2010 | Mujtaba |
| 7,859,987 B2 | 12/2010 | Ouyang et al. |
| 8,054,739 B2 | 11/2011 | Nakao et al. |
| 8,077,669 B2 | 12/2011 | Kim |
| 8,077,696 B2 | 12/2011 | Izumi et al. |
| 8,116,290 B2 | 2/2012 | Moorti et al. |
| 8,126,090 B1 | 2/2012 | Nabar |
| 8,144,647 B2 | 3/2012 | Nabar et al. |
| 8,149,811 B2 | 4/2012 | Nabar et al. |
| 8,155,138 B2 | 4/2012 | van Nee |
| 8,175,119 B2 | 5/2012 | Zhang et al. |
| 8,254,361 B2 | 8/2012 | Nakao et al. |
| 8,270,909 B2 | 9/2012 | Zhang et al. |
| 8,289,869 B2 | 10/2012 | Sawai |
| 8,339,978 B2 | 12/2012 | Sawai et al. |
| 8,379,757 B1 | 2/2013 | Zhang et al. |
| 8,400,968 B2 | 3/2013 | Liu et al. |
| 8,437,440 B1 | 5/2013 | Zhang et al. |
| 8,462,863 B1 | 6/2013 | Zhang et al. |
| 8,472,383 B1 | 6/2013 | Banerjea et al. |
| 8,514,976 B2 | 8/2013 | Kim et al. |
| 8,526,351 B2 | 9/2013 | Fischer et al. |
| 8,571,010 B1 | 10/2013 | Zhang et al. |
| 8,599,803 B1 | 12/2013 | Zhang et al. |
| 8,599,804 B2 | 12/2013 | Erceg et al. |
| 8,619,907 B2 | 12/2013 | Mujtaba et al. |
| 8,644,128 B2 | 2/2014 | Zhang et al. |
| 8,660,497 B1 | 2/2014 | Zhang et al. |
| 8,665,908 B1 | 3/2014 | Zhang et al. |
| 8,665,974 B2 | 3/2014 | Zhang et al. |
| 8,724,546 B2 | 5/2014 | Zhang et al. |
| 8,724,720 B2 | 5/2014 | Srinivasa et al. |
| 8,873,652 B2 | 5/2014 | Srinivasa et al. |
| 8,773,969 B1 | 7/2014 | Zhang et al. |
| 8,867,653 B2 | 10/2014 | Zhang et al. |
| 8,873,525 B2 | 10/2014 | Liu et al. |
| 8,885,620 B2 | 11/2014 | Liu et al. |
| 8,886,755 B1 | 11/2014 | Liu et al. |
| 8,891,435 B2 | 11/2014 | Zhang et al. |
| 8,923,217 B2 | 12/2014 | Liu et al. |
| 8,948,283 B2 | 2/2015 | Zhang |
| 8,971,167 B1 | 3/2015 | Srinivasa et al. |
| 9,021,341 B1 | 4/2015 | Srinivasa et al. |
| 9,118,530 B2 | 8/2015 | Srinivasa et al. |
| 9,131,528 B2 | 9/2015 | Zhang et al. |
| 9,178,651 B2 | 11/2015 | Srinivasa et al. |
| 9,351,333 B1 | 5/2016 | Zhang et al. |
| 9,397,873 B2 | 7/2016 | Zhang et al. |
| 9,596,715 B1 | 3/2017 | Zhang et al. |
| 9,706,599 B1 | 7/2017 | Zhang et al. |
| 9,768,996 B2 | 9/2017 | Zhang et al. |
| 9,832,059 B2 | 11/2017 | Zhang et al. |
| 9,924,512 B1 | 3/2018 | Zhang et al. |
| 10,070,482 B1 | 9/2018 | Zhang et al. |
| 2002/0174172 A1 | 11/2002 | Hatalkar |
| 2003/0193889 A1 | 10/2003 | Jacobsen |
| 2004/0081073 A1 | 4/2004 | Walton et al. |
| 2004/0208253 A1 | 10/2004 | Joo |
| 2005/0034053 A1 | 2/2005 | Jacobsen et al. |
| 2005/0111451 A1 | 5/2005 | Kim |
| 2005/0195733 A1 | 9/2005 | Walton et al. |
| 2005/0204258 A1 | 9/2005 | Hansen et al. |
| 2005/0276347 A1 | 12/2005 | Mujtaba et al. |
| 2006/0233271 A1 | 10/2006 | Savas et al. |
| 2006/0268671 A1 | 11/2006 | Coon |
| 2007/0140100 A1 | 6/2007 | Ouyang et al. |
| 2007/0140364 A1 | 6/2007 | Ouyang et al. |
| 2007/0153725 A1 | 7/2007 | Waxman |
| 2008/0002649 A1 | 1/2008 | Xia et al. |
| 2008/0205648 A1 | 8/2008 | Hanov et al. |
| 2008/0225819 A1 | 9/2008 | Niu et al. |
| 2008/0285526 A1 | 11/2008 | Gorokhov et al. |
| 2009/0022093 A1 | 1/2009 | Nabar et al. |
| 2009/0022128 A1 | 1/2009 | Nabar et al. |
| 2009/0059877 A1 | 3/2009 | Utsunomiya et al. |
| 2009/0060094 A1 | 3/2009 | Jung et al. |
| 2009/0190547 A1 | 7/2009 | Shi et al. |
| 2009/0196163 A1 | 8/2009 | Du |
| 2009/0323850 A1 | 12/2009 | van Nee |
| 2010/0014603 A1 | 1/2010 | Palanki et al. |
| 2010/0046656 A1 | 2/2010 | van Nee et al. |
| 2010/0054371 A1 | 3/2010 | Namgoong et al. |
| 2010/0098146 A1 | 4/2010 | Kim et al. |
| 2010/0111220 A1 | 5/2010 | Rouquette-Leveil et al. |
| 2010/0246543 A1 | 9/2010 | Rajkotia et al. |
| 2010/0260159 A1 | 10/2010 | Zhang et al. |
| 2010/0322334 A1 | 12/2010 | Wang et al. |
| 2011/0002219 A1 | 1/2011 | Kim et al. |
| 2011/0002280 A1 | 1/2011 | Davydov et al. |
| 2011/0026623 A1 | 2/2011 | Srinivasa et al. |
| 2011/0026639 A1 | 2/2011 | Rouquette-Leveil et al. |
| 2011/0051845 A1 | 3/2011 | Schmidl et al. |
| 2011/0080963 A1 | 4/2011 | Kim |
| 2011/0096796 A1 | 4/2011 | Zhang et al. |
| 2011/0096797 A1 | 4/2011 | Zhang et al. |
| 2011/0261708 A1 | 10/2011 | Grandhi |
| 2011/0310827 A1 | 12/2011 | Srinivasa et al. |
| 2012/0039196 A1 | 2/2012 | Zhang |
| 2012/0039292 A1 | 2/2012 | Lee et al. |
| 2012/0054587 A1 | 3/2012 | Van Nee et al. |
| 2012/0195391 A1 | 8/2012 | Zhang et al. |
| 2012/0201316 A1 | 8/2012 | Zhang et al. |
| 2012/0294294 A1 | 11/2012 | Zhang |
| 2012/0294392 A1 | 11/2012 | Zhang |
| 2012/0320889 A1 | 12/2012 | Zhang et al. |
| 2012/0327871 A1 | 12/2012 | Ghosh et al. |
| 2013/0128807 A1 | 5/2013 | Vermani et al. |
| 2013/0153298 A1 | 6/2013 | Pietraski et al. |
| 2013/0202001 A1 | 8/2013 | Zhang |
| 2013/0229996 A1 | 9/2013 | Wang et al. |
| 2013/0259017 A1 | 10/2013 | Zhang et al. |
| 2013/0287043 A1 | 10/2013 | Nanda et al. |
| 2013/0315264 A1 | 11/2013 | Srinivasa et al. |
| 2014/0126659 A1 | 5/2014 | Srinivasa et al. |
| 2014/0205029 A1 | 7/2014 | Srinivasa et al. |
| 2014/0211775 A1 | 7/2014 | Sampath et al. |
| 2014/0362935 A1 | 12/2014 | Porat et al. |
| 2015/0009894 A1 | 1/2015 | Vermani et al. |
| 2015/0071372 A1 | 3/2015 | Zhang |
| 2015/0117227 A1 | 4/2015 | Zhang et al. |
| 2015/0117433 A1 | 4/2015 | Zhang et al. |
| 2015/0131517 A1 | 5/2015 | Chu et al. |
| 2015/0207602 A1 | 7/2015 | Yang et al. |
| 2015/0304077 A1 | 10/2015 | Cao et al. |
| 2015/0304078 A1 | 10/2015 | Cao et al. |
| 2015/0327166 A1 | 11/2015 | Kenney et al. |
| 2015/0349995 A1 | 12/2015 | Zhang et al. |
| 2015/0365263 A1 | 12/2015 | Zhang et al. |
| 2015/0365264 A1 | 12/2015 | Srinivasa et al. |
| 2015/0365266 A1 | 12/2015 | Zhang et al. |
| 2016/0050093 A1 | 2/2016 | Choi et al. |
| 2016/0072654 A1 | 3/2016 | Choi et al. |
| 2016/0156750 A1 | 6/2016 | Zhang et al. |
| 2018/0006860 A1 | 1/2018 | Zhang et al. |

FOREIGN PATENT DOCUMENTS

| | | |
|---|---|---|
| JP | 2004-200923 A | 7/2004 |
| JP | 2005-341317 A | 12/2005 |
| JP | 2009-520436 A | 5/2009 |
| JP | 2013-542671 A | 11/2013 |
| WO | WO-2006/007571 | 1/2006 |

(56) References Cited

FOREIGN PATENT DOCUMENTS

| WO | WO-2008/004155 A2 | 1/2008 |
|---|---|---|
| WO | WO-2008/081683 | 7/2008 |
| WO | WO-2009/028886 A2 | 3/2009 |
| WO | WO-2009/035418 | 3/2009 |
| WO | WO-2012/122119 | 9/2012 |
| WO | WO-2013/116237 | 8/2013 |
| WO | WO-2014/022695 | 2/2014 |
| WO | WO-2015/061729 | 4/2015 |

OTHER PUBLICATIONS

IEEE Std 802.11n/D8.0, Feb. 2009 "Draft Standard for Information Technology—Telecommunications and information exchange between systems—Local and metropolitan area networks—Specific requirements, Part 11: Wireless LAN Medium Access Control(MAC)and Physical Layer (PHY) specifications: Amendment 5: Enhancements for Higher Throughput", The Institute for Electrical and Electronics Engineers, pp. i, ii, 258, 260-264, 287, 293, 346-347, 350-351, 354-356 (Feb. 2009).

U.S. Appl. No. 14/701,208, Sun et al., "Adaptive Orthogonal Frequency Division Multiplexing (OFDM) Numerology in a Wireless Communication Network," filed Apr. 30, 2015.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput, " The Institute and Electronics Engineers, Inc., Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., Oct. 2009.

Chen, "Home Network Basis: Transmission Environments and Wired/Wireless Protocols," Prentice Hall, pp. 1-26 (Jul. 2003).

De Vegt, "Potential Compromise for 802.11ah Use Case Document", Institute of Electrical and Electronics Engineers, doc. No. IEEE 802.11-11/0457r0, pp. 1-27 (Mar. 2011).

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Hiertz, et al., "The IEEE 802.11 Universe," IEEE Communications Magazine, pp. 62-70, (Jan. 2010).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

IEEE Std 802.11™.2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," The Institute of Electrical and Electronics Engineers, Inc., (1999).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-408 (Oct. 2012).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," The Institute of Electrical and Electronics Engineers, Inc., Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information Technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," The Institute of Electrical and Electronics Engineers, Inc., Apr. 2003.

Lee et al., "TGaf PHY proposal," The Institute of Electrical and Electronics Engineers, doc. No. IEEE 802.11-12/0809r5, pp. 1-43 (Jul. 10, 2012).

(56) References Cited

OTHER PUBLICATIONS

Mujtaba, "IEEE P802.11—Wireless LANs, TGn Sync Proposal Technical Specification," The Institute of Electrical and Electronics Engineers, Inc., doc.: IEEE 802.11-04/0889r6, pp. 1-131 (May 2005).

Park, "Proposed Specification Framework for TGah D9.x", The Institute of Electrical and Electronics Engineers, doc. No. IEEE 802.11-yy/xxxxr0, pp. 1-30 (Jul. 2012).

Park, "Proposed Specification Framework for TGah", The Institute of Electrical and Electronics Engineers, doc. No. IEEE 802.11--yy/xxxxr05, (Jan. 2012), pp. 1-12.

Park, "Proposed Specification Framework for TGah", *The Institute of Electrical and Electronics Engineers*, doc. No. IEEE 802.11-11/1137r11, pp. 1-36 (Sep. 2012).

Park, "Proposed Specification Framework for TGah", *The Institute of Electrical and Electronics Engineers*, doc. No. IEEE 802.11-11/1137r6, pp. 1-13 (Mar. 2012).

Perahia, et al., "Gigabit Wireless LANs: an overview of IEEE 802.11ac and 80211 ad," ACM SIGMOBILE Mobile Computing and Communications Review, vol. 15, No. 3, pp. 23-33 (Jul. 2011).

Shao, "Channel Selection for 802.11ah," doc.: IEEE 802.11-12/0816r0, pp. 1-11 (Jul. 2012).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, Institute for Electrical and Electronics Engineers, pp. 1-49, (Jan. 18, 2011).

Taghavi et al., "Introductory Submission for TGah", doc. No. IEEE 802.11-11/0062r0, *Institute for Electrical and Electronics Engineers*, pp. 1-5 (Jan. 14, 2011).

Van Nee et al. "The 802.11n MIMO-OFDM Standard for Wireless LAN and Beyond," Wireless Personal Communications, vol. 37, pp. 445-453 (Jun. 2006).

Vermani et al. "Preamble Format for 1 MHz," *The Institute of Electrical and Electronics Engineers*, doc. No. IEEE 802.11-11/1482r2, pp. 1-30 (Nov. 2011).

Vermani et al. "Spec Framework Text for PHY Numerology," The Institute of Electrical and Electronics Engineers, doc. No. IEEE 802.11-11/1311r0, pp. 1-5 (Sep. 2011).

Yu et al., "Coverage extension for IEEE802.11ah," *The Institute of Electrical and Electronics Engineers*, doc. No. IEEE 802.11-11/0035r1, pp. 1-10 (Jan. 2011).

Zhang et al., "1 MHz Waveform in Wider BW ", The Institute of Electrical and Electronics Engineers, doc. No. IEEE 802.11-12/0309r1, pp. 1-10 (Mar. 2012).

Zhang et al., "11ah Data Transmission Flow," *The Institute of Electrical and Electronics Engineers*, doc. No. IEEE 802.11-11/1484r1, pp. 1-15 (Nov. 2011).

Zhang et al., "Beamforming Feedback for Single Stream," The Institute of Electrical and Electronics Engineers, doc No. IEEE 802.11-12/1312r0, pp. 1-22 (Nov. 12, 2012).

Cariou et al., "Multi-channel Transmissions," Doc. No. IEEE 802.11-09/1022r0, *The Institute of Electrical and Electronics Engineers, Inc.*, pp. 1-13 (Sep. 2009).

Chun et al. "Legacy Support on HEW frame structure," doc: IEEE 11-13/1057r0, *The Institute of Electrical and Electronics Engineers, Inc.*, pp. 1-8 (Sep. 2013).

Ho et al., "Final Draft: SDD Text on Downlink MIMO Schemes", IEEE 802.16 Broadband Wireless Access Working Group, pp. 1-12 (Jul. 7, 2008).

IEEE 802.20-PD-06; IEEE P802.20™ v14, Draft 802.20 Permanent Document; <System Requirements for IEEE 802.20 Mobile Broadband Wireless Access Systems—Version 14>, 24 pages (Jul. 16, 2004).

IEEE P802.11ah™/D1.3 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-466 (Apr. 2014).

IEEE Std 802.11ahTM™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

IEEE Std 802.16-2009 (Revision of IEEE Std. 802.16-2004), IEEE Standard for Local and metropolitan area networks: Part 16: Air Interface for Broadband Wireless Access Systems, The Institute of Electrical and Electronics Engineers, Inc., 2082 pages(May 29, 2009).

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma D7.0), pp. 1-1212 (2006).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Noh et al., "Channel Selection and Management for 11 ac," Doc. No. IEEE 802.11-10/0593r1, *The Institute of Electrical and Electronics Engineers, Inc.*, pp. 1-21 (May 20, 2010).

Park, "Specification Framework for TGah," *The Institute of Electrical and Electronics Engineers*, doc. No. IEEE 802.11-11/1137r13, pp. 1-58 (Jan. 14, 2013).

Shi et al., "Phase Tracking During VHT-LTF," Doc. No. IEEE 802.11-10/07711-0, The Institute of Electrical and Electronics Engineers, Inc., pp. 1-19 (Jul. 2010).

Syafei et al., "A Design of Next Generation Gigabit MIMO Wireless LAN System" IEEE 12th Int'l Conference on Advanced Communication Technology (ICACT 2010), *The Institute of Electrical and Electronics Engineers*, pp. 941-46 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, pp. 207-211 (2009).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Van Zelst et al., "Pilot Sequence for VHT-DATA," Doc. No. IEEE 802.11-10/0811r1, *The Institute of Electrical and Electronics Engineers, Inc.*, pp. 1-10 (Jul. 2010).

Yuan et al., "Carrier Aggregation for LTE-Advanced Mobile Communication Systems," *IEEE Communications Magazine*, pp. 88-93 (Feb. 2010).

Zhang et al., "HE PHY Padding and Packet Extension," IEEE 802.11-15/0810, https://mentor.ieee.org/802.11/dcn/15/11-15-0810-00-00ax-he-phy-padding-and-packet-extension.pptx, 38 pages (Jul. 10, 2015).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

(56) References Cited

OTHER PUBLICATIONS

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

PACKETS WITH MIDAMBLES HAVING COMPRESSED OFDM SYMBOLS

CROSS-REFERENCES TO RELATED APPLICATIONS

This application claims the benefit of U.S. Provisional Patent Application No. 62/517,724, entitled "MIMO-OFDM Midamble with Compressed HE-LTF," filed on Jun. 9, 2017, which is hereby incorporated by reference herein in its entirety.

FIELD OF THE DISCLOSURE

The present disclosure relates generally to communication networks and, more particularly, to physical layer protocol data units having midambles.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method for wireless communication includes: generating, at a communication device, a physical layer (PHY) preamble of a PHY protocol data unit, wherein the PHY preamble is generated to include i) a first training field to be used by a receiver for synchronization, and ii) one or more second training fields to be used by the receiver for channel estimation and fine synchronization; generating, at the communication device, i) a first portion of a PHY data payload of the PHY protocol unit, and ii) a second portion of the PHY data payload of the PHY protocol data unit, wherein the first portion of the PHY data payload and the second portion of the PHY data payload include a plurality of first orthogonal frequency division multiplexing (OFDM) symbols, wherein each of multiple first OFDM symbols among the first plurality of OFDM symbols has a first duration; and generating, at the communication device, a PHY midamble of the PHY protocol data unit, wherein: the PHY midamble is to be transmitted subsequent to transmission of the first portion of the PHY data payload and prior to transmission of the second portion of the PHY data payload, the PHY midamble is generated to include one or more third training fields to be used by the receiver for channel estimation and fine synchronization, and each of the third training fields includes a respective second OFDM symbol having a second duration shorter than the first duration.

In another embodiment, an apparatus comprises a network interface device having one or more integrated circuit (IC) devices. The one or more IC devices are configured to: generate a physical layer (PHY) preamble of a PHY protocol data unit, wherein the PHY preamble is generated to include i) a first training field to be used by a receiver for synchronization, and ii) one or more second training fields to be used by the receiver for channel estimation and fine synchronization; generate i) a first portion of a PHY data payload of the PHY protocol unit, and ii) a second portion of the PHY data payload of the PHY protocol data unit, wherein the first portion of the PHY data payload and the second portion of the PHY data payload include a plurality of first orthogonal frequency division multiplexing (OFDM) symbols, wherein each of multiple first OFDM symbols among the first plurality of OFDM symbols has a first duration; and generate a PHY midamble of the PHY protocol data unit, wherein: the PHY midamble is to be transmitted subsequent to transmission of the first portion of the PHY data payload and prior to transmission of the second portion of the PHY data payload, the PHY midamble is generated to include one or more third training fields to be used by the receiver for channel estimation and fine synchronization, and each of the third training fields includes a respective second OFDM symbol having a second duration shorter than the first duration.

In yet another embodiment, a method for wireless communication includes: receiving, at a communication device, a physical layer (PHY) protocol data unit, wherein the PHY protocol data unit includes: a PHY preamble having i) a first training field, and ii) one or more second training fields, a first portion of a PHY data payload of the PHY protocol unit, a second portion of the PHY data payload of the PHY protocol data unit, wherein the first portion and the second portion include a plurality of first orthogonal frequency division multiplexing (OFDM) symbols, wherein each of multiple first OFDM symbols among the first plurality of OFDM symbols has a first duration, and a PHY midamble of the PHY protocol data unit between the first portion of the PHY data payload and the second portion of the PHY data payload, wherein the PHY midamble includes one or more third training fields, and wherein each of the third training fields includes a respective second OFDM symbol having a second duration shorter than the first duration. The method also comprises: using, at the communication device, the first training field for synchronization; using, at the communication device, the one or more second training fields to generate a channel estimate for processing the first portion of the PHY data payload; and using, at the communication device, the one or more third training fields to update the channel estimate, or generate a new channel estimate, for processing the second portion of the PHY data payload.

In still another embodiment, an apparatus comprises: a network interface device having one or more integrated circuit (IC) devices. The one or more IC devices are configured to: receive a physical layer (PHY) protocol data unit, wherein the PHY protocol data unit includes: a PHY preamble having i) a first training field, and ii) one or more second training fields, a first portion of a PHY data payload of the PHY protocol unit, a second portion of the PHY data payload of the PHY protocol data unit, wherein the first portion and the second portion include a plurality of first orthogonal frequency division multiplexing (OFDM) symbols, wherein each of multiple first OFDM symbols among the first plurality of OFDM symbols has a first duration, and a PHY midamble of the PHY protocol data unit between the first portion of the PHY data payload and the second portion of the PHY data payload, wherein the PHY midamble includes one or more third training fields, and wherein each of the third training fields includes a respective second OFDM symbol having a second duration shorter than the first duration. The one or more IC devices are further configured to: use the first training field for synchronization, use the one or more second training fields to generate a channel estimate for processing the first portion of the PHY data payload, and use the one or more third training fields to update the channel estimate, or generate a new channel estimate, for processing the second portion of the PHY data payload.

DETAILED DESCRIPTION

In embodiments described below, communication devices such as an access point (AP) and client stations of a wireless local area network (WLAN) transmit data streams between the AP and the client stations. To enable receiving devices to properly demodulate data portions of data units, transmitting devices include training fields, generated so as to enable accurate estimation of a communication channel, in the physical layer (PHY) preamble of at least some of the data units. To compensate for Doppler effects, or when otherwise desired, transmitting devices include training fields in a PHY midamble in at least some of the data units. In particular, a wireless network device transmits a midamble between portions of a data payload of a single PHY protocol data unit, so as to enable updating a channel estimate (or re-estimating the communication channel) during the transmission of the single PHY protocol data unit. A communication device that receives a midamble in a single PHY protocol data unit uses the information included in the midamble to estimate the communication channel (or update a previous channel estimate) to facilitate processing of a latter portion the single PHY protocol data unit.

Figure 1:
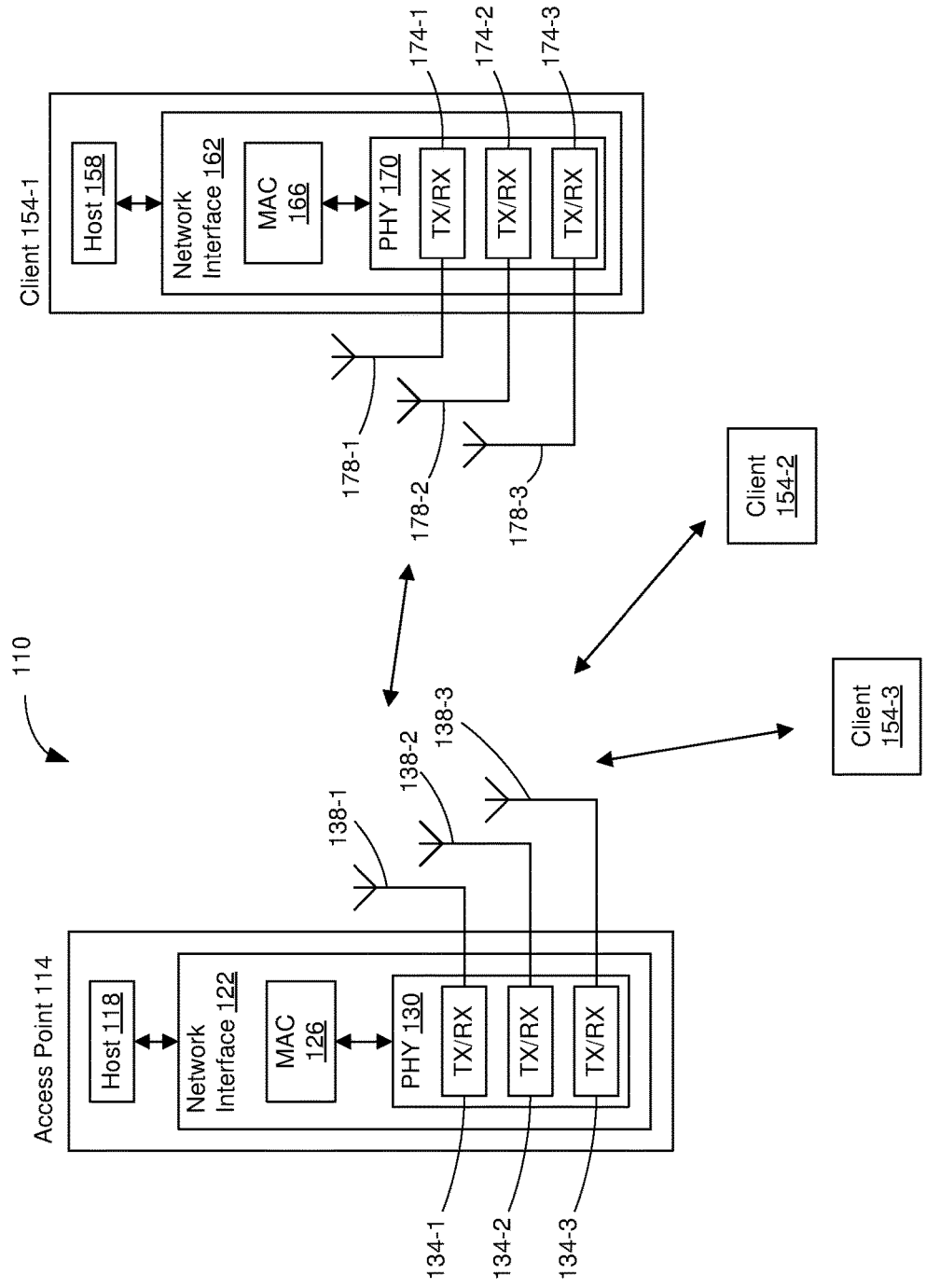
FIG. 1 is a block diagram of an example wireless local area network (WLAN) 10, according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard, a future version of the IEEE 802.11 Standard, or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Packets generated by communication devices such as the network interface device 122 and/or the network interface device 162 sometimes are generated to include both a PHY preamble and one or more PHY midambles to allow a receiving device to update channel estimation, adjust synchronization, during reception of a single packet. For example, if the packet is very long (e.g., greater than 65,535 octets), in situations such as when a channel is particularly noisy, in situations such as when relative movement between a transmitting device and a receiving device causes a Doppler effect, and/or in situations such as when movement of objects in the environment a Doppler effect, etc., refining a channel estimate and/or synchronization more than once during the reception of a single packet unit may be beneficial. A transmitting device generates the PHY preamble and one or more PHY midambles so as to allow a receiving device to estimate a communication channel between the transmitting device and the receiving device and/or to refine synchronization during reception of the packet, and accordingly demodulate a data payload of the packet.

Accordingly, one or more PHY midambles are included within a data portion of the packet, e.g., each PHY midamble is adjacent to data from the payload at both a beginning of the PHY midamble and an end of the PHY midamble. Each PHY midamble includes one or more OFDM symbols that include training information (sometimes referred to as calibration information), at least a portion of which may be used for one or more of retraining channel training or estimation, refining frequency synchronization or carrier frequency offset (CFO), calculating a steering matrix or other parameters used in beamforming, adapting to a communication link, automatic gain control, etc. Embodiments of midambles described herein may have particular applicability to communication systems in which a packet duration is longer than durations of channel coherence, such as in wireless systems that use longer wavelengths, and/or in communication systems that experience a Doppler effect.

Figure 2:
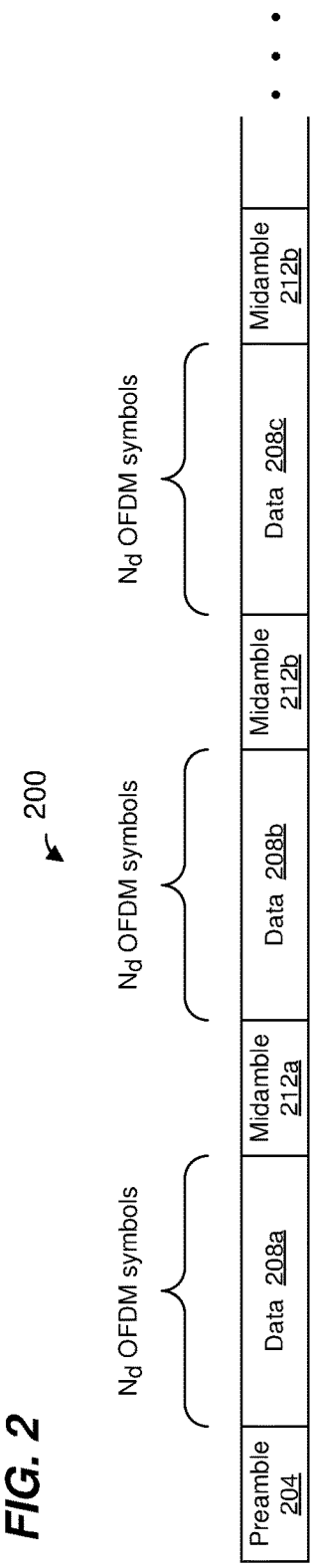
FIG. 2 is a diagram of an example physical layer (PHY) protocol data unit having midambles, according an embodiment.

FIG. 2 is a diagram of an example packet 200, according to an embodiment. In an embodiment, the network interface 122 (FIG. 1) is configured to generate and transmit the packet 200, and the network interface 162 (FIG. 1) is configured to receive and process the packet 200. In some embodiments, the network interface 162 (FIG. 1) is configured to generate and transmit the packet 200, and the network interface 122 (FIG. 1) is configured to receive and process the packet 200. The data unit 200 may occupy a 20 MHz bandwidth or another suitable bandwidth. Data units similar to the data unit 200 occupy other suitable bandwidth such as 1 MHz, 2 MHz, 5 MHz, 10 MHz, 40 MHz, 80 MHz, 160 MHz, 320 MHz, 640 MHz, for example, or other suitable bandwidths, in other embodiments.

The packet 200 includes a PHY preamble 204 and a partitioned data payload comprising data portions 208, between which are located PHY midambles 212. The PHY preamble 204 has a format suitable for use in WLANs, according to an embodiment. Although three PHY midambles 212 are illustrated in FIG. 2, in other embodiments and/or scenarios, there may be a different suitable number of PHY midambles, such as one, two, four, five, six, etc.

In an embodiment, each PHY midamble 208 includes one or more OFDM symbols. In an embodiment, each data portion 208 includes $N_d$ OFDM symbols, where $N_d$ is a suitable positive integer, e.g., the data portion of the packet 200 is divided into equally-sized portions 208. In some embodiments, however, at least two portions 208 of differ in size, e.g., the data portion 208a has $N_{d1}$ symbols, and the data portion 208c has $N_{d2}$ symbols, where $N_{d1}$ and $N_{d2}$ are not equal.

In some embodiments, $N_d$ is defined by a communication protocol. In some embodiments, the communication protocol defines a set of multiple values from which $N_d$ can be chosen. In some embodiments, the communication protocol defines different values of $N_d$ for different applications and/or different modes of operation. In some embodiments, the network interface device 122/162 chooses $N_d$ based on channel conditions (e.g., a rate of variation of the communication channel over time).

Figure 3A:
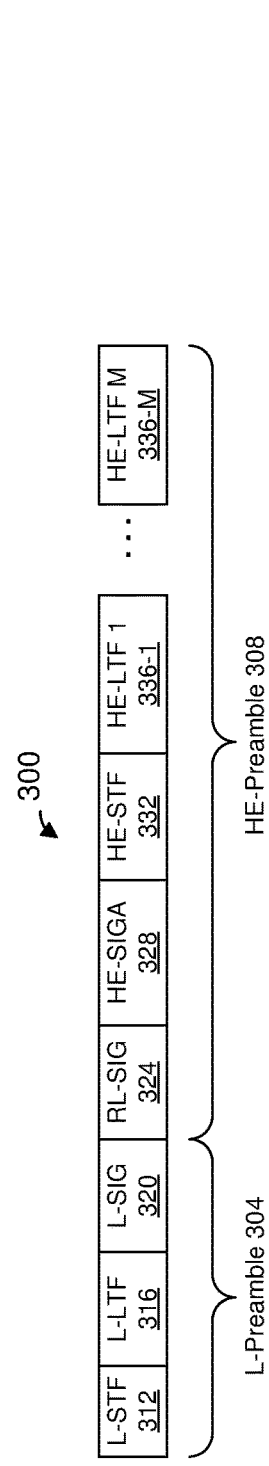
FIG. 3A is a diagram of an example PHY preamble of the PHY protocol data unit of FIG. 2, according to an embodiment.

FIG. 3A is a diagram of an example PHY preamble 300 that is included in the packet 200 of FIG. 2 (e.g., the PHY preamble 204 includes the PHY preamble 300), according to an embodiment. In an embodiment, the example PHY preamble 300 is for use in packets being transmitted as a single user (SU) transmission.

The PHY preamble 300 includes a legacy portion 304, and a non-legacy portion 308. The legacy portion 204 includes a legacy short training field (L-STF) 312, a legacy long training field (L-LTF) 316, and a legacy signal field (L-SIG) 320. The non-legacy portion 308 includes a repeated L-SIG field (RL-SIG) 324, a high efficiency (HE) signal field (HE-SIGA) 328, an HE short training field (HE-STF) 332, and M HE long training fields (HE-LTFs) 336, where M is a suitable positive integer. In an embodiment, M generally corresponds to (e.g., is greater than or equal to) a number of spatial streams via which the data unit 200 will be transmitted. In some embodiments, the PHY preamble 300 omits one or more of the fields illustrated in FIG. 3A. In some embodiments, the PHY preamble 300 includes additional fields not illustrated in FIG. 3A.

Each of the L-STF 312, the L-LTF 316, the L-SIG 320, the RL-SIG 324, the HE-SIGA 328, the HE-STF 332, and the M HE-LTFs 336 comprises one or more OFDM symbols. As merely an illustrative example, the HE-SIGA 328 comprises two OFDM symbols.

In an embodiment in which a packet that includes the PHY preamble 300 spans a 20 MHz wide communication channel, the PHY preamble 300 includes one of each of the L-STF 312, the L-LTF 316, the L-SIG 320, the RL-SIG 324 and the HE-SIGA 328. In some embodiments in which a data unit similar to the packet 200 occupies a cumulative bandwidth other than 20 MHz, each of the L-STF 312, the L-LTF 316, the L-SIG 320, the RL-SIG 324, and the HE-SIGA 328 is repeated over a corresponding number of 20 MHz sub-bands of the whole bandwidth of the packet, in an embodiment. For example, in an embodiment in which the packet occupies an 80 MHz bandwidth, the preamble 300 includes four of each of the L-STF 312, the L-LTF 316, the L-SIG 320, the RL-SIG 324, and the HE-SIG-A 328 across four 20 MHz sub-bands.

In an embodiment, the HE-SIGA 328 generally carries information about the format of the packet 200, such as information needed to properly decode at least a portion of the packet 200, in an embodiment. In some embodiments, HE-SIGA 328 additionally includes information for receivers that are not intended receivers of the packet 200, such as information needed for medium protection, spatial reuse, etc.

Figure 3B:
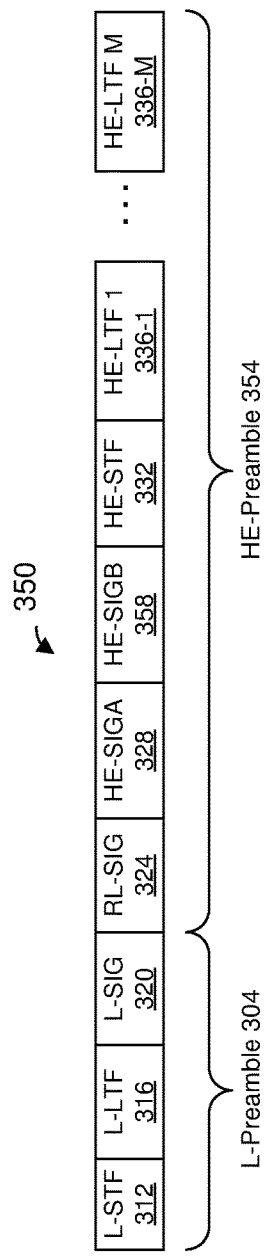
FIG. 3B is a diagram of another example PHY preamble of the PHY protocol data unit of FIG. 2, according to another embodiment.

FIG. 3B is a diagram of another example PHY preamble 350 that is included in the packet 200 of FIG. 2 (e.g., the PHY preamble 204 includes the PHY preamble 350), according to an embodiment. In an embodiment, the example preamble 350 is for use in packets being transmitted as a multi-user (MU) transmission (e.g., employing orthogonal frequency division multiple access (OFDMA) and/or MU multiple-input, multiple-output (MU-MIMO). In an embodiment, the PHY preamble 350 is for use in a downlink (DL) OFDMA data unit in which independent data streams are transmitted to multiple client stations 154 using respective sets of OFDM tones and, in some cases respective spatial streams, allocated to the client stations 154. For example, in an embodiment, available OFDM tones (e.g., OFDM tones that are not used as DC tone and/or guard tones) are segmented into multiple resource units (RUs), and each of the multiple RUs is allocated to transmissions to one or more client stations 154. In an embodiment, the preamble 350 is for use in a DL MU-MIMO data unit in which independent data streams are transmitted to multiple client stations 154 using respective spatial streams allocated to the client stations 154.

The PHY preamble 350 is similar to the PHY preamble 300 of FIG. 3A, and like-numbered elements are not described again in detail for purposes of brevity.

The PHY preamble 350 includes the legacy portion 304 and a non-legacy portion 354. The non-legacy portion 354 includes an HE signal field (HE-SIGB) 358.

In another embodiment in which a packet similar to the packet 200 occupies a cumulative bandwidth other than 20 MHz, different HE-SIGBs 358 having different subchannel-specific information corresponding to different frequency sub-bands of the whole frequency bandwidth of the packet are transmitted in parallel in different frequency sub-bands of the whole frequency bandwidth of the packet 200. In another embodiment in which a packet similar to the data unit 200 occupies a cumulative bandwidth other than 20 MHz, the HE-SIGB 358 is repeated over a corresponding number of frequency sub-bands of the whole bandwidth of the packet 200.

The HE-SIGA 328 and the HE-SIGB 358 generally carry information about the format of the packet 200, such as information needed to properly decode at least a portion of the packet 200, in an embodiment. The HE-SIGA 328 carries information commonly needed by multiple intended receivers of the packet 200. On the other hand, the HE-SIGB 358 carries user-specific information individually needed by each intended receiver of the packet 200. In an embodiment, HE-SIGA 328 includes information needed to properly decode HE-SIGB 358, and HE-SIGB 358 includes information needed to properly decode data streams in the data portion 208 of the packet 200.

In some embodiments, the PHY preamble 350 omits one or more of the fields illustrated in FIG. 3B. In some embodiments, the PHY preamble 350 includes additional fields not illustrated in FIG. 3B.

Figure 4A:
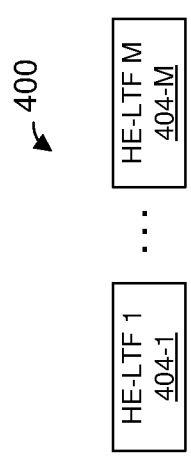
FIG. 4A is a diagram of an example PHY midamble of the PHY protocol data unit of FIG. 2, according to an embodiment.

FIG. 4A is a diagram of an example PHY midamble 400 that is included in the packet 200 of FIG. 2 (e.g., each PHY midamble 212 includes the PHY midamble 400), according to an embodiment.

The PHY midamble 400 comprises M HE-LTFs 404, where M is a suitable positive integer. In an embodiment, M generally corresponds to (e.g., is greater than or equal to) a number of spatial streams ($N_{STS}$) via which the packet 200 will be transmitted. In an embodiment, the PHY midamble 400 consists of the M HE-LTFs 404.

Space-frequency interleaving allows different sub-carriers (sometimes referred to as "tones") in one OFDM symbol in a PHY midamble to be interleaved over all spatial streams. For example, if there are two spatial streams, odd-indexed tones are transmitted via a first spatial stream, and even-indexed tones are transmitted via a second spatial stream. As another example, if there are four spatial streams, tones 4k are transmitted via a first spatial stream, tones 4k+1 are transmitted via a second spatial stream, tones 4k+2 are transmitted via a third spatial stream, and tones 4k+3 are transmitted via a fourth spatial stream, where k is an index that various from 0 to K/4−1, where K is a number of tones in the OFDM symbol. In an embodiment, respective OFDM symbols in respective HE-LTFs 404 utilize a different space-frequency interleaving such that different spatial streams are transmitted via different tones in each HE-LTF 404. With space-frequency interleaving, M is less than $N_{STS}$, according to an embodiment. In other embodiments, M is greater than or equal to $N_{STS}$ even when using space-frequency interleaving.

Figure 4B:
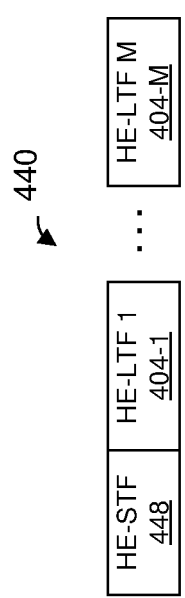
FIG. 4B is a diagram of another example PHY midamble of the PHY protocol data unit of FIG. 2, according to another embodiment.

FIG. 4B is a diagram of another example PHY midamble 440 that is included in the packet 200 of FIG. 2 (e.g., each PHY midamble 212 includes the PHY midamble 440), according to an embodiment.

The PHY midamble 440 comprises the M HE-LTFs 404 and an HE-STF 448. In an embodiment, the PHY midamble 440 consists of the M HE-LTFs 404 and the HE-STF 448.

In an embodiment, a duration of the HE-STF 448 is the same as a duration of the HE-STF 332 in the PHY preamble 204 (FIGS. 2, 3A, 3B). In another embodiment, the duration of the HE-STF 448 is less than the duration of the HE-STF 332 in the PHY preamble 204 (FIGS. 2, 3A, 3B). As an illustrative example, if the duration of the HE-STF 332 in the PHY preamble 204 is 4 μsecs, the duration of the HE-STF 448 is 2 μsecs.

In an embodiment, a network interface device that receives a packet having the PHY midamble 440 uses the HE-STF 448 to perform AGC adjustment prior to processing the HE-LTF(s) 404, e.g., during a guard interval (GI) of the HE-LTF 404-1.

Referring again to FIG. 4A, a network interface device that receives a packet having the PHY midamble 400 uses an OFDM symbol (in a data portion 208) that immediately precedes the PHY midamble 400 to perform AGC adjustment prior to processing the HE-LTF(s) 404, e.g., during the GI of the HE-LTF 404-1.

Referring now to FIGS. 3A, 3B, 4A and 4B, OFDM symbols corresponding to the HE-LTFs 336/404 optionally have a shorter duration as compared OFDM symbols in other portions of the packet 200, such as in the data portions 208. For example, different transmission modes correspond to different durations of each OFDM symbol in the HE-LTFs 404.

In an embodiment, to generate an HE-LTF 404 having a compressed duration (e.g., with respect to the duration of OFDM symbols in the data portions 208), the network interface device 122/162 (e.g., the PHY processor 130/170) generates a frequency-domain sequence (corresponding to OFDM tones) to include non-zero values at every L-th tone, and zero values between the non-zero tones, where L is a positive integer corresponding to an HE-LTF compression ratio. For example, when L is four, the frequency-domain sequence includes a non-zero value at every fourth tone, and the remaining tones are zero-tones. As another example, when L is two, the frequency-domain sequence includes a non-zero value at every other tone, and the remaining tones are zero-tones. Transmission modes corresponding to L>1 are sometimes referred to herein as "compression modes".

The network interface device 122/162 (e.g., the PHY processor 130/170) converts the frequency-domain sequence to a time-domain signal by performing an IDFT. The time-domain signal includes L periods of a training signal corresponding to the frequency-domain sequence. The network interface device 122/162 (e.g., the PHY processor 130/170) then truncates the time-domain signal to include only a single period (e.g., the first 1/L of the time-domain signal) of the training signal. For example, when the time-domain signal consists of K samples, the time-domain signal is truncated to K/L samples (e.g., the first K/L samples of the time-domain signal), in an embodiment.

In another embodiment, the network interface device 122/162 (e.g., the PHY processor 130/170) directly generates a compressed HE-LTF 404 OFDM symbol without first generating L periods of the training signal. For example, the network interface device 122/162 (e.g., the PHY processor 130/170) generates a frequency-domain sequence (corresponding to OFDM tones) that corresponds to the single period of the training signal. In an embodiment, the frequency-domain sequence has a length K/L, where K is a size of the IDFT used to generate OFDM symbols for the data portions 208. The network interface device 122/162 (e.g., the PHY processor 130/170) converts the frequency-domain sequence to a time-domain signal by performing an IDFT of size K/L. The time-domain signal corresponds to the single period of the training signal.

In some embodiments, the duration of OFDM symbols corresponding to the HE-LTFs 404 depends on a transmission mode in which the data unit 200 is transmitted. For example, in an embodiment, in a first mode, OFDM symbols corresponding to the HE-LTFs 404 are uncompressed with respect to OFDM symbols of the data portions 208; in a second mode, the OFDM symbols corresponding to the HE-LTFs 404 are compressed by 1/2 with respect to OFDM symbols of the data portions 208; and, in a third mode, the OFDM symbols corresponding to the HE-LTFs 404 are compressed by 1/4 with respect to OFDM symbols of the data portions 208. In another embodiment, in a first mode, OFDM symbols corresponding to the HE-LTFs 404 are uncompressed with respect to OFDM symbols of the data portions 208; and, in a second mode, the OFDM symbols corresponding to the HE-LTFs 404 are compressed (e.g., by 1/2, 1/4, or some other suitable compression ratio) with respect to OFDM symbols of the data portions 208.

In an embodiment, the particular mode used is signaled in a signal field in the packet. For example, the HE-SIGA field 328 (FIGS. 3A, 3B) in the preamble 204 of the packet (FIG. 2), or the HE-SIGB field 358 (FIG. 3B) in the preamble 204 of the packet (FIG. 2), includes a subfield that indicates the particular mode. In an embodiment, a first value of the subfield indicates that no compression is used for the OFDM symbols of the HE-LTFs 404, a second value of the subfield indicates that 1/2 compression is used for the OFDM symbols of the HE-LTFs 404, and a third value of the subfield indicates that 1/4 compression is used for the OFDM symbols of the HE-LTFs 404. In another embodiment, a first value of the subfield indicates that no compression is used for the OFDM symbols of the HE-LTFs 404, and a second value of the subfield indicates that compression (e.g., 1/2, 1/4, or some other suitable compression ratio) is used for the OFDM symbols of the HE-LTFs 404.

In some embodiments, a duration of each HE-LTF 336 in the PHY preamble 204 is the same as the duration of each HE-LTF 404 in the PHY midamble 212 in each transmission mode. In such embodiments, a single subfield (e.g., in the HE-SIGA field 328 or the HE-SIGB field 358) indicates the particular mode and thus indicates the duration of both the HE-LTF(s) 336 in the PHY preamble 204 and the HE-LTF(s) 404 in the PHY midamble 212. In other embodiments, a duration of each HE-LTF 336 in the PHY preamble 204 may be different than the duration of each HE-LTF 404 in the PHY midamble 212. In such embodiments, a first subfield (e.g., in the HE-SIGA field 328 or the HE-SIGB field 358) indicates the duration of the HE-LTF(s) 336 in the PHY preamble 204, and a second subfield (e.g., in the HE-SIGA field 328 or the HE-SIGB field 358) indicates the duration of the HE-LTF(s) 404 in the PHY midamble 212.

In some embodiments, the network interface device 122/162 (e.g., the PHY processor 130/170) inserts a guard interval (GI) prior to or after each OFDM symbol corresponding to the HE-LTFs 336/404. In some embodiments a duration of each GI corresponding to the HE-LTFs 404 optionally has a shorter duration as compared to GIs inserted prior to/after OFDM symbols in other portions of the packet 200, such as in the data portions 208. For example, different transmission modes correspond to different durations of the GI(s) corresponding to the OFDM symbol(s) in the HE-LTF(s) 404.

In some embodiments, the duration of the GI(s) corresponding to the HE-LTF(s) 404 depends on a transmission mode in which the data unit 200 is transmitted. For example, in an embodiment, in a first mode, GI(s) corresponding to the HE-LTF(s) 404 have a first duration which is the same duration of GIs corresponding to OFDM symbols of the data portions 208; in a second mode, GI(s) corresponding to the HE-LTF(s) 404 have a second duration which is different than the duration of GIs corresponding to OFDM symbols of the data portions 208; and, in a third mode, GI(s) corresponding to the HE-LTF(s) 404 have a third duration which is different than i) the second duration and ii) the duration of GIs corresponding to OFDM symbols of the data portions 208. In another embodiment, in a first mode, GI(s) corresponding to the HE-LTF(s) 404 have a first duration which is the same duration of GIs corresponding to OFDM symbols of the data portions 208; and in a second mode, GI(s) corresponding to the HE-LTF(s) 404 have a second duration which is different than the duration of GIs corresponding to OFDM symbols of the data portions 208.

In an embodiment, the particular mode used is signaled in a signal field in the packet. For example, the HE-SIGA field 328 (FIGS. 3A, 3B) in the preamble 204 of the packet (FIG. 2), or the HE-SIGB field 358 (FIG. 3B) in the preamble 204 of the packet (FIG. 2), includes a subfield that indicates the particular mode. In an embodiment, a first value of the subfield indicates that GI(s) corresponding to the HE-LTFs 404 have a first duration that is the same a duration of GIs corresponding to OFDM symbols in the data portions 208; a second value of the subfield indicates that GI(s) corresponding to the HE-LTFs 404 have a second duration that is different than the duration of GIs corresponding to OFDM symbols in the data portions 208; and a third value of the subfield indicates that GI(s) corresponding to the HE-LTFs 404 have a third duration that is different than i) the second duration, and ii) the duration of GIs corresponding to OFDM symbols in the data portions 208. In another embodiment, a first value of the subfield indicates that GI(s) corresponding to the HE-LTFs 404 have a first duration that is the same a duration of GIs corresponding to OFDM symbols in the data portions 208; and a second value of the subfield indicates that GI(s) corresponding to the HE-LTFs 404 have a second duration that is different than the duration of GIs corresponding to OFDM symbols in the data portions 208.

In some embodiments, a duration of GI(s) for the HE-LTF(s) 336 in the PHY preamble 204 is the same as the duration of GI(s) for the HE-LTF(s) 404 in the PHY midamble 212 in each transmission mode. In such embodiments, a single subfield (e.g., in the HE-SIGA field 328 or the HE-SIGB field 358) indicates the particular mode and thus indicates the duration of both the GI(s) for the HE-LTF(s) 336 in the PHY preamble 204 and the GI(s) for the HE-LTF(s) 404 in the PHY midamble 212. In other embodiments, a duration of GI(s) for the HE-LTF(s) 336 in the PHY preamble 204 may be different than the duration of GI(s) for the HE-LTF(s) 404 in the PHY midamble 212. In such embodiments, a first subfield (e.g., in the HE-SIGA field 328 or the HE-SIGB field 358) indicates the duration of the GI(s) for the HE-LTF(s) 336 in the PHY preamble 204, and a second subfield (e.g., in the HE-SIGA field 328 or the HE-SIGB field 358) indicates the duration of the GI(s) for the HE-LTF(s) 404 in the PHY midamble 212.

In an embodiment, a duration of GIs corresponding to the HE-LTFs 336/404 is selected from a set of possible GI durations including 0.8 µs, 1.6 µs, and 3.2 µs. In other embodiments, the set of possible GI durations includes other suitable time durations in addition to, or instead of, any of 0.8 µs, 1.6 µs, and 3.2 µs.

In some embodiments, each transmission mode corresponds to a tuple comprising i) a particular compression ratio (e.g., 1/L), and ii) a particular GI duration for the HE-LTF(s) 404 in the PHY midamble 212. For example, in an embodiment, a first transmission mode corresponds to a first tuple comprising i) a compression ratio of one, and ii) a GI duration of 3.2 µs; a second transmission mode corresponds to a second tuple comprising i) a compression ratio of 1/2, and ii) a GI duration of 0.8 µs; a third transmission mode corresponds to a third tuple comprising i) a compression ratio of 1/2, and ii) a GI duration of 1.6 µs; and a fourth transmission mode corresponds to i) a compression ratio of 1/4, and ii) a GI duration of 0.8 µs. In other embodiments, the set of transmission modes includes other suitable tuples of compression ratios and GI durations in addition to, or instead of, the tuples described above.

In some embodiments, in each transmission mode, a duration of GI(s) for the HE-LTF(s) 336 in the PHY preamble 204 is the same as the duration of GI(s) for the HE-LTF(s) 404 in the PHY midamble 212, and a compression ratio (e.g., 1/L) for the HE-LTF(s) 336 in the PHY preamble 204 is the same as the compression ratio for the HE-LTF(s) 404 in the PHY midamble 212. In such embodiments, a single subfield (e.g., in the HE-SIGA field 328 or the HE-SIGB field 358) indicates the particular transmission mode.

In other embodiments, a duration of GI(s) for the HE-LTF(s) 336 in the PHY preamble 204 may be different than the duration of GI(s) for the HE-LTF(s) 404 in the PHY midamble 212, and/or the compression ratio (e.g., 1/L) for the HE-LTF(s) 336 in the PHY preamble 204 may be different than the compression ratio for the HE-LTF(s) 404 in the PHY midamble 212. In such embodiments, a first subfield (e.g., in the HE-SIGA field 328 or the HE-SIGB field 358) indicates the GI duration/compression ratio for HE-LTF(s) 336 in the PHY preamble 204, and a second subfield (e.g., in the HE-SIGA field 328 or the HE-SIGB field 358) indicates the GI duration/compression ratio for HE-LTF(s) 404 in the PHY midamble 212.

Figure 5:
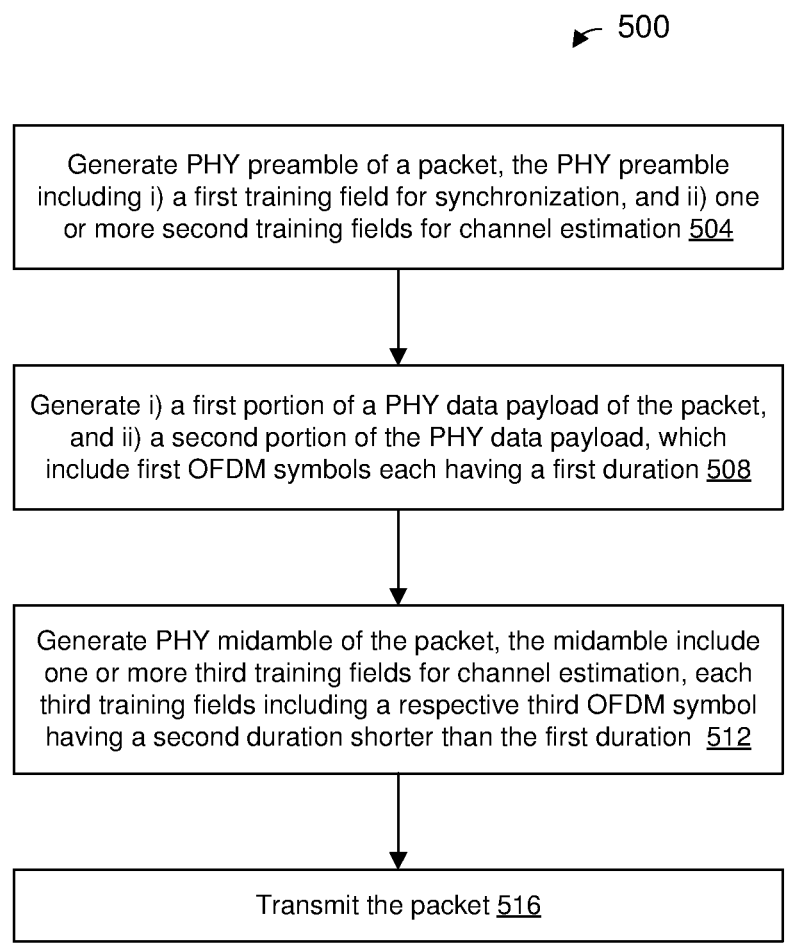
FIG. 5 is a flow diagram of an example method for transmitting a PHY protocol data unit such as the PHY protocol data unit of FIG. 2, according to an embodiment.

FIG. 5 is a flow diagram of an example method 500 for transmitting a PHY protocol data unit, according to an embodiment. With reference to FIG. 1, the method 500 is implemented by the network interface device 122, in an embodiment. For example, in one such embodiment, the PHY processor 130 is configured to implement at least a portion of the method 500. According to another embodiment, the MAC processor 126 is also configured to implement a portion of the method 500. With continued reference to FIG. 1, in yet another embodiment, the method 500 is implemented by the network interface device 162 (e.g., the PHY processor 170 and, optionally, the MAC processor 166).

The method 500 is described with reference to FIG. 1 merely for explanatory purpose. In other embodiments, the method 500 is implemented by another suitable communication device different than the communication devices of FIG. 1.

At block 504, a communication device (e.g., the PHY processor 130, the PHY processor 170, etc.) generates a PHY preamble of a PHY protocol data unit. The PHY preamble is generated to include i) a first training field to be used by a receiver for synchronization, and ii) one or more second training fields to be used by the receiver for channel estimation and, optionally, fine synchronization. For example, the communication device (e.g., the PHY processor 130, the PHY processor 170, etc.) generates the PHY preamble 300 (FIG. 3A). As another example, the communication device (e.g., the PHY processor 130, the PHY processor 170, etc.) generates the PHY preamble 350 (FIG. 3B). In other embodiments, the communication device (e.g., the PHY processor 130, the PHY processor 170, etc.) generates another suitable PHY preamble different than the PHY preamble 300 and the PHY preamble 350.

At block 508, the communication device (e.g., the PHY processor 130, the PHY processor 170, etc.) generates i) a first portion of a PHY data payload of the PHY protocol unit, and ii) a second portion of the PHY data payload of the PHY protocol data unit. The first portion and the second portion include a plurality of first OFDM symbols, and each of multiple first OFDM symbols among the plurality of first OFDM symbols has a first duration. For example, the communication device (e.g., the PHY processor 130, the PHY processor 170, etc.) generates the portions 208*a* and 208*b* (FIG. 2).

At block 512, the communication device (e.g., the PHY processor 130, the PHY processor 170, etc.) generates a PHY midamble of the PHY protocol data unit. The PHY midamble is to be transmitted subsequent to transmission of the first portion of the PHY data payload and prior to transmission of the second portion of the PHY data payload. The communication device (e.g., the PHY processor 130, the PHY processor 170, etc.) generates the PHY midamble to include one or more third training fields to be used by the receiver for channel estimation and, optionally, fine synchronization, and each of the third training fields includes a respective second OFDM symbol having a second duration shorter than the first duration. For example, the communication device (e.g., the PHY processor 130, the PHY processor 170, etc.) generates the PHY midamble 400 (FIG. 4A). As another example, the communication device (e.g., the PHY processor 130, the PHY processor 170, etc.) generates the PHY midamble 440 (FIG. 4B). In other embodiments, the communication device (e.g., the PHY processor 130, the PHY processor 170, etc.) generates another suitable PHY midamble different than the PHY midamble 400 and the PHY midamble 440.

In an embodiment, each second OFDM symbol in the PHY midamble corresponds to a respective frequency domain sequence corresponding to a plurality of tones. In an embodiment, every L-th tone is modulated and tones between modulated tones are zero tones, where L is a positive integer greater than one. In an embodiment, a time duration of each second OFDM symbol is 1/L of a time duration of a full IDFT of the respective frequency domain sequence.

In an embodiment, block 512 includes the communication device (e.g., the PHY processor 130, the PHY processor 170, etc.) performing an IDFT of the respective frequency domain sequence of the second OFDM symbol to generate at least a first 1/L portion of a time-domain sequence corresponding to the full IDFT of the frequency domain sequence. In an embodiment, block 512 includes the communication device (e.g., the PHY processor 130, the PHY processor 170, etc.) truncating a time-domain sequence corresponding to the full IDFT of the frequency domain sequence to the first 1/L portion of the time-domain sequence corresponding to the full IDFT of the frequency domain sequence.

In an embodiment, L is 4 when a first training field compression mode is used to generate each second OFDM symbol, and L is 2 when a second training field compression mode is used to generate each second OFDM symbol.

In an embodiment, each of the second training fields includes a respective third OFDM symbol having a third duration shorter than the first duration. In an embodiment, the third duration is equal to the second duration.

At block 516, the communication device (e.g., the PHY processor 130, the PHY processor 170, etc.) transmits the PHY protocol data unit. For example, the communication device (e.g., the PHY processor 130, the PHY processor 170, etc.) transmits the packet 200 (FIG. 2).

In some embodiments, the method 500 further includes the communication device (e.g., the PHY processor 130, the PHY processor 170, the MAC processor 126, the MAC processor 166, etc.) determining a periodicity of PHY midambles (e.g., determining $N_d$) in the PHY protocol data unit. In an embodiment, the method 500 further includes determining a channel condition of a communication channel (e.g., a rate of change of the communication channel over time) via which the PHY protocol data unit is to be transmitted. In an embodiment, the periodicity of PHY midambles (e.g., $N_d$) is determined using the determined channel condition. In some embodiments, the method 500 further includes generating the PHY preamble to include an indication of the periodicity of PHY midambles (e.g., $N_d$).

In some embodiments, block 504 includes generating the PHY preamble to include an indication of the second duration of each second OFDM symbol in the PHY midamble.

In some embodiments, the method 500 includes inserting a respective GI prior to, or after, each second OFDM symbol in the PHY midamble. In an embodiment, block 504 includes generating the PHY preamble to include an indication of a duration of each GI inserted prior to, or after, each second OFDM symbol in the PHY midamble.

Figure 6:
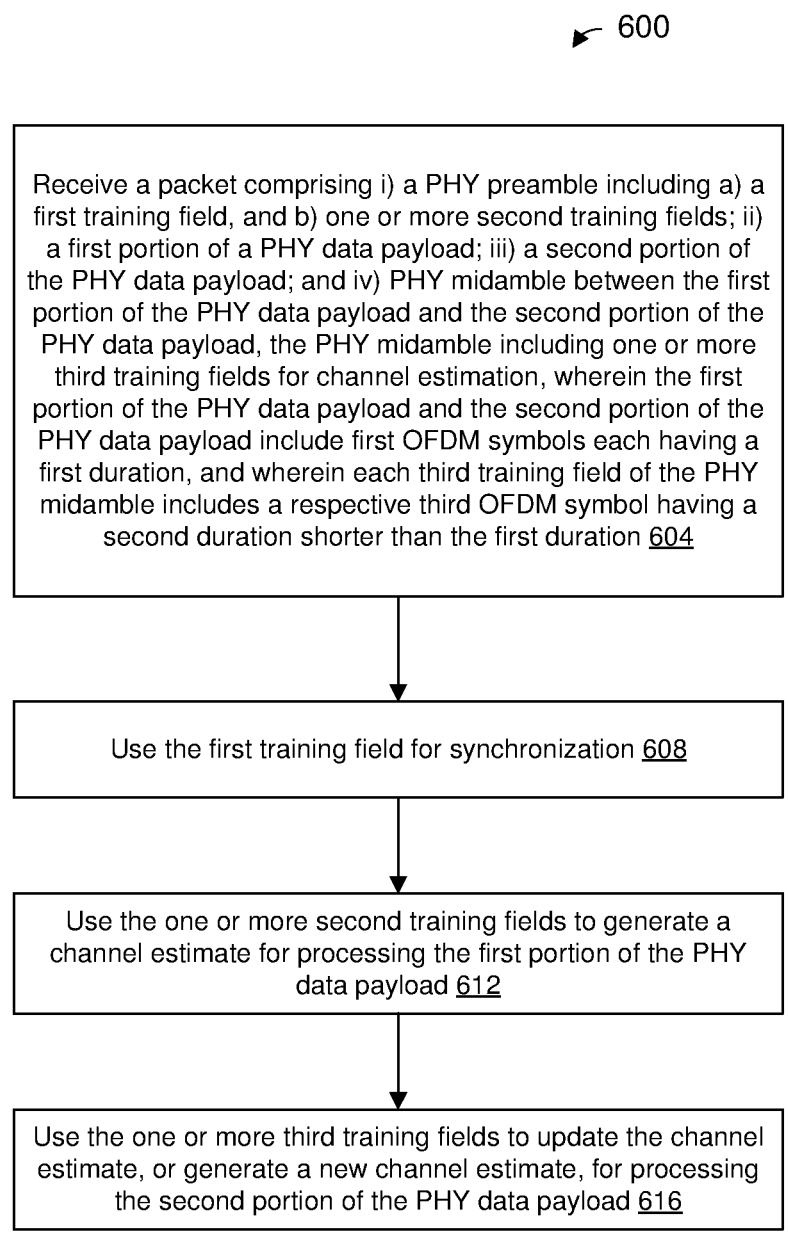
FIG. 6 is a flow diagram of an example method for processing a PHY protocol data unit such as the PHY protocol data unit of FIG. 2, according to an embodiment.

FIG. 6 is a flow diagram of an example method 600 for processing a PHY protocol data unit received via a communication channel, according to an embodiment. With reference to FIG. 1, the method 600 is implemented by the network interface device 122, in an embodiment. For example, in one such embodiment, the PHY processor 130 is configured to implement at least a portion of the method 600. According to another embodiment, the MAC processor 126 is also configured to implement a portion of the method 600. With continued reference to FIG. 1, in yet another embodiment, the method 600 is implemented by the network interface device 162 (e.g., the PHY processor 170 and, optionally, the MAC processor 166).

The method 600 is described with reference to FIG. 1 merely for explanatory purpose. In other embodiments, the method 600 is implemented by another suitable communication device different than the communication devices of FIG. 1.

At block 604, a communication device (e.g., the PHY processor 130, the PHY processor 170, etc.) receives a PHY protocol data unit comprising i) a PHY preamble including a) a first training field, and b) one or more second training fields; ii) a first portion of a PHY data payload, iii) a second portion of the PHY data payload; and iv) a PHY midamble between the first portion of the PHY data payload and the second portion of the PHY data payload, the PHY midamble having one or more third training fields.

The first portion of the PHY data payload and the second portion of the PHY data payload include a plurality of first OFDM symbols, and each of multiple first OFDM symbols among the plurality of first OFDM symbols has a first duration. Each of the third training fields in the PHY midamble includes a respective second OFDM symbol having a second duration shorter than the first duration.

In an embodiment, block 604 includes receiving the packet 200 (FIG. 2). For example, the packet 200 includes the PHY preamble 300 (FIG. 3A). As another example, the packet includes the PHY preamble 350 (FIG. 3B). In other embodiments, the packet includes another suitable PHY preamble different than the PHY preamble 300 and the PHY preamble 350.

In an embodiment, the first portion of the PHY data payload and the second portion of the PHY data payload corresponds to the portions 208a and 208b (FIG. 2).

In an embodiment, the PHY midamble corresponds to the PHY midamble 400 (FIG. 4A). As another example, the PHY midamble corresponds to the PHY midamble 440 (FIG. 4B). In other embodiments, the PHY midamble corresponds to another suitable PHY midamble different than the PHY midamble 400 and the PHY midamble 440.

In an embodiment, each second OFDM symbol in the PHY midamble corresponds to a respective frequency domain sequence corresponding to a plurality of tones. In an embodiment, every L-th tone is modulated and tones between modulated tones are zero tones, where L is a positive integer greater than one. In an embodiment, a time duration of each second OFDM symbol is 1/L of a time duration of a full IDFT of the respective frequency domain sequence.

In an embodiment, L is 4 in a first compression mode, and L is 2 in a second compression mode.

In an embodiment, each of the second training fields includes a respective third OFDM symbol having a third duration shorter than the first duration. In an embodiment, the third duration is equal to the second duration.

At block 608, the communication device (e.g., the PHY processor 130, the PHY processor 170, etc.) uses the first training field for synchronization. In an embodiment, the first training field corresponds to the HE-STF 332 (FIGS. 3A, 3B).

At block 612, the communication device (e.g., the PHY processor 130, the PHY processor 170, etc.) uses the one or more second training fields to generate a channel estimate for processing the first portion of the PHY data payload. In an embodiment, the one or more second training fields corresponds to the HE-LTF(s) 336 (FIGS. 3A, 3B), and the first portion of the PHY data payload corresponds to the portion 208a (FIG. 2).

At block 616, the communication device (e.g., the PHY processor 130, the PHY processor 170, etc.) uses the one or more third training fields to generate update the channel estimate, or generate a new channel estimate, for processing the second portion of the PHY data payload. In an embodiment, the one or more third training fields corresponds to the HE-LTF(s) 404 (FIGS. 4A, 4B), and the second portion of the PHY data payload corresponds to the portion 208b (FIG. 2).

In some embodiments, the method 600 further includes the communication device (e.g., the PHY processor 130, the PHY processor 170, the MAC processor 126, the MAC processor 166, etc.) determining a periodicity of PHY midambles (e.g., determining $N_d$) in the PHY protocol data unit. In some embodiments, determining the periodicity of PHY midambles (e.g., determining $N_d$) includes processing an indication of the periodicity of PHY midambles (e.g., $N_d$) in the PHY preamble.

In some embodiments, the method 600 further includes the communication device (e.g., the PHY processor 130, the PHY processor 170, the MAC processor 126, the MAC processor 166, etc.) determining the second duration of each second OFDM symbol in the PHY midamble. In an embodiment, determining the second duration of each second OFDM symbol in the PHY midamble includes processing an indication of the duration in the PHY preamble.

In some embodiments, a respective GI is inserted prior to, or after, each second OFDM symbol in the PHY midamble. In some embodiments, the method 600 further includes the communication device (e.g., the PHY processor 130, the PHY processor 170, the MAC processor 126, the MAC processor 166, etc.) determining a duration of each GI is inserted prior to, or after, each second OFDM symbol in the PHY midamble. In some embodiments, determining the duration of each GI inserted prior to, or after, each second OFDM symbol in the PHY midamble includes processing an indication of the duration in the PHY preamble.

Embodiment 1

A method for wireless communication, the method comprising: generating, at a communication device, a physical layer (PHY) preamble of a PHY protocol data unit, wherein the PHY preamble is generated to include i) a first training field to be used by a receiver for synchronization, and ii) one or more second training fields to be used by the receiver for channel estimation and fine synchronization; generating, at the communication device, i) a first portion of a PHY data payload of the PHY protocol unit, and ii) a second portion of the PHY data payload of the PHY protocol data unit, wherein the first portion of the PHY data payload and the second portion of the PHY data payload include a plurality of first orthogonal frequency division multiplexing (OFDM) symbols, wherein each of multiple first OFDM symbols among the first plurality of OFDM symbols has a first duration; and generating, at the communication device, a PHY midamble of the PHY protocol data unit, wherein: the PHY midamble is to be transmitted subsequent to transmission of the first portion of the PHY data payload and prior to transmission of the second portion of the PHY data payload, the PHY midamble is generated to include one or more third training fields to be used by the receiver for channel estimation and fine synchronization, and each of the third training fields includes a respective second OFDM symbol having a second duration shorter than the first duration.

Embodiment 2

The method of Embodiment 1, wherein: each second OFDM symbol corresponds to a respective frequency domain sequence corresponding to a plurality of tones, every L-th tone is modulated and tones between modulated tones are zero tones, L is a positive integer greater than one, and a time duration of each second OFDM symbol is 1/L of a time duration of a full inverse discrete Fourier transform (IDFT) of the respective frequency domain sequence.

Embodiment 3

The method of Embodiment 2, wherein generating each second OFDM symbol includes: performing, at the communication device, an IDFT of the respective frequency domain sequence of the second OFDM symbol to generate at least a first 1/L portion of a time-domain sequence corresponding to the full IDFT of the frequency domain sequence.

Embodiment 4

The method of Embodiment 3, wherein generating each second OFDM symbol includes: truncating, at the communication device, a time-domain sequence corresponding to the full IDFT of the frequency domain sequence to the first 1/L portion of the time-domain sequence corresponding to the full IDFT of the frequency domain sequence.

Embodiment 5

The method of Embodiment 2, wherein: L is 4 when a first training field compression mode is used to generate each second OFDM symbol; and L is 2 when a second training field compression mode is used to generate each second OFDM symbol.

Embodiment 6

The method of any of Embodiments 1-5, wherein: each of the second training fields includes a respective third OFDM symbol having a third duration shorter than the first duration.

Embodiment 7

The method of Embodiment 6, wherein: the third duration is equal to the second duration.

Embodiment 8

The method of any of Embodiments 1-5, wherein: each of the second training fields includes a respective third OFDM symbol; generating the PHY preamble comprises inserting a respective first guard interval (GI) in connection with each third OFDM symbol of the one or more second training fields; generating the PHY midamble comprises inserting a respective second GI in connection with each second OFDM symbol of the one or more third training fields; and a duration of each first GI is equal to a duration of each second GI.

Embodiment 9

The method of any of Embodiments 1-5, wherein: each of the second training fields includes a respective third OFDM symbol; generating the PHY preamble comprises inserting a respective first guard interval (GI) in connection with each third OFDM symbol of the one or more second training fields; generating the PHY midamble comprises inserting a respective second GI in connection with each second OFDM symbol of the one or more third training fields; and a duration of each first GI is different than a duration of each second GI.

Embodiment 10

The method of any of Embodiments 1-9, further comprising: generating, at the communication device, a plurality of PHY midambles of the PHY protocol data unit; including, at the communication device, the plurality of PHY midambles in the PHY protocol data unit such that the PHY protocol data unit includes N OFDM symbols corresponding to the PHY data payload between adjacent PHY midambles, wherein N is a positive integer less than 1000; and determining, at the communication device, N based on conditions of a communication channel via which the PHY protocol data unit is to be transmitted.

Embodiment 11

An apparatus, comprising: a network interface device having one or more integrated circuit (IC) devices. The one or more IC devices are configured to: generate a physical layer (PHY) preamble of a PHY protocol data unit, wherein the PHY preamble is generated to include i) a first training field to be used by a receiver for synchronization, and ii) one or more second training fields to be used by the receiver for channel estimation and fine synchronization; generate i) a first portion of a PHY data payload of the PHY protocol unit, and ii) a second portion of the PHY data payload of the PHY protocol data unit, wherein the first portion of the PHY data payload and the second portion of the PHY data payload include a plurality of first orthogonal frequency division multiplexing (OFDM) symbols, wherein each of multiple first OFDM symbols among the first plurality of OFDM symbols has a first duration; and generate a PHY midamble of the PHY protocol data unit, wherein: the PHY midamble is to be transmitted subsequent to transmission of the first portion of the PHY data payload and prior to transmission of the second portion of the PHY data payload, the PHY midamble is generated to include one or more third training fields to be used by the receiver for channel estimation and fine synchronization, and each of the third training fields includes a respective second OFDM symbol having a second duration shorter than the first duration.

Embodiment 12

The apparatus of Embodiment 11, wherein: each second OFDM symbol corresponds to a respective frequency domain sequence corresponding to a plurality of tones, every L-th tone is modulated and tones between modulated tones are zero tones, wherein L is a positive integer greater than one, and a time duration of each second OFDM symbol is 1/L of a time duration of a full inverse discrete Fourier transform (IDFT) of the respective frequency domain sequence.

Embodiment 13

The apparatus of Embodiment 12, wherein the one or more IC devices are further configured to: perform an IDFT of the respective frequency domain sequence of the second OFDM symbol to generate at least a first 1/L portion of a time-domain sequence corresponding to the full IDFT of the frequency domain sequence.

Embodiment 14

The apparatus of Embodiment 13, wherein the one or more IC devices are further configured to: truncate a time-domain sequence corresponding to the full IDFT of the frequency domain sequence to the first 1/L portion of the time-domain sequence corresponding to the full IDFT of the frequency domain sequence.

Embodiment 15

The apparatus of Embodiment 12, wherein: L is 4 when a first training field compression mode is used to generate each second OFDM symbol; and L is 2 when a second training field compression mode is used to generate each second OFDM symbol.

Embodiment 16

The apparatus of any of Embodiments 11-15, wherein: each of the second training fields includes a respective third OFDM symbol having a third duration shorter than the first duration.

Embodiment 17

The apparatus of Embodiment 16, wherein: the third duration is equal to the second duration.

Embodiment 18

The apparatus of any of Embodiments 11-15, wherein: each of the second training fields includes a respective third OFDM symbol; the one or more IC devices are further configured to: insert a respective first guard interval (GI) in connection with each third OFDM symbol of the one or more second training fields in the PHY preamble, and insert a respective second GI in connection with each second OFDM symbol of the one or more third training fields in the PHY preamble; and a duration of each first GI is equal to a duration of each second GI.

Embodiment 19

The apparatus of any of Embodiments 11-15, wherein: each of the second training fields includes a respective third OFDM symbol; the one or more IC devices are further configured to: insert a respective first guard interval (GI) in connection with each third OFDM symbol of the one or more second training fields in the PHY preamble, and insert a respective second GI in connection with each second OFDM symbol of the one or more third training fields in the PHY preamble; and a duration of each first GI is different than a duration of each second GI.

Embodiment 20

The apparatus of any of Embodiments 11-19, wherein the one or more IC devices are further configured to: generate a plurality of PHY midambles of the PHY protocol data unit; include the plurality of PHY midambles in the PHY protocol data unit such that the PHY protocol data unit includes N OFDM symbols corresponding to the PHY data payload between adjacent PHY midambles, wherein N is a positive integer less than 1000; and determine N based on conditions of a communication channel via which the PHY protocol data unit is to be transmitted.

Embodiment 21

The apparatus of any of Embodiments 11-20, wherein the network interface device comprises: a media access control (MAC) processing unit implemented on the one or more IC devices; and a PHY processing unit implemented on the one or more IC devices and coupled to the MAC processing unit.

Embodiment 22

A method for wireless communication, the method comprising: receiving, at a communication device, a physical layer (PHY) protocol data unit, wherein the PHY protocol data unit includes: a PHY preamble having i) a first training field, and ii) one or more second training fields, a first portion of a PHY data payload of the PHY protocol unit, a second portion of the PHY data payload of the PHY protocol data unit, wherein the first portion and the second portion include a plurality of first orthogonal frequency division multiplexing (OFDM) symbols, wherein each of multiple first OFDM symbols among the first plurality of OFDM symbols has a first duration, and a PHY midamble of the PHY protocol data unit between the first portion of the PHY data payload and the second portion of the PHY data payload, wherein the PHY midamble includes one or more third training fields, and wherein each of the third training fields includes a respective second OFDM symbol having a second duration shorter than the first duration. The method also comprises: using, at the communication device, the first training field for synchronization; using, at the communication device, the one or more second training fields to generate a channel estimate for processing the first portion of the PHY data payload; and using, at the communication device, the one or more third training fields to update the channel estimate, or generate a new channel estimate, for processing the second portion of the PHY data payload.

Embodiment 23

The method of Embodiment 22, wherein: each second OFDM symbol corresponds to a respective frequency domain sequence corresponding to a plurality of tones, wherein every L-th tone is modulated and tones between modulated tones are zero tones, wherein L is a positive integer greater than one, and wherein a time duration of each second OFDM symbol is 1/L of a time duration of a full inverse discrete Fourier transform (IDFT) of the respective frequency domain sequence.

Embodiment 24

The method of Embodiment 23, wherein: L is 4 when a first compression mode is used for the PHY protocol data unit; and L is 2 when a second compression mode is used for the PHY protocol data unit.

Embodiment 25

The method of any of Embodiments 22-24, wherein: each of the second training fields includes a respective third OFDM symbol having a third duration shorter than the first duration.

Embodiment 26

The method of Embodiment 25, wherein: the third duration is equal to the second duration.

Embodiment 27

The method of any of Embodiments 22-26, further comprising: analyzing, at the communication device, information in the PHY preamble to determine the second duration of each second OFDM symbol in the one or more third training fields in the PHY midamble; and processing, at the communication device, the one or more third training fields according to the determined second duration.

Embodiment 28

The method of any of Embodiments 22-27, wherein: a respective first guard interval (GI) corresponds to each third OFDM symbol of the one or more second training fields in the PHY preamble; a respective second GI corresponds to each second OFDM symbol of the one or more third training fields in the PHY midamble; and the method further comprises: analyzing, at the communication device, information in the PHY preamble to determine a duration of each second GI corresponding to each second OFDM symbol of the one or more third training fields in the PHY midamble, and processing, at the communication device, the one or more third training fields according to the determined duration of each second GI.

Embodiment 29

The method of Embodiment 28, wherein: a duration of each first GI is different than the duration of each second GI.

Embodiment 30

An apparatus, comprising: a network interface device having one or more integrated circuit (IC) devices. The one or more IC devices are configured to: receive a physical layer (PHY) protocol data unit, wherein the PHY protocol data unit includes: a PHY preamble having i) a first training field, and ii) one or more second training fields, a first portion of a PHY data payload of the PHY protocol unit, a second portion of the PHY data payload of the PHY protocol data unit, wherein the first portion and the second portion include a plurality of first orthogonal frequency division multiplexing (OFDM) symbols, wherein each of multiple first OFDM symbols among the first plurality of OFDM symbols has a first duration, and a PHY midamble of the PHY protocol data unit between the first portion of the PHY data payload and the second portion of the PHY data payload, wherein the PHY midamble includes one or more third training fields, and wherein each of the third training fields includes a respective second OFDM symbol having a second duration shorter than the first duration. The one or more IC devices are further configured to: use the first training field for synchronization, use the one or more second training fields to generate a channel estimate for processing the first portion of the PHY data payload, and use the one or more third training fields to update the channel estimate, or generate a new channel estimate, for processing the second portion of the PHY data payload.

Embodiment 31

The apparatus of Embodiment 30, wherein: each second OFDM symbol corresponds to a respective frequency domain sequence corresponding to a plurality of tones, wherein every L-th tone is modulated and tones between modulated tones are zero tones, wherein L is a positive integer greater than one, and wherein a time duration of each second OFDM symbol is 1/L of a time duration of a full inverse discrete Fourier transform (IDFT) of the respective frequency domain sequence.

Embodiment 32

The apparatus of Embodiment 31, wherein: L is 4 when a first compression mode is used for the PHY protocol data unit; and L is 2 when a second compression mode is used for the PHY protocol data unit.

Embodiment 33

The apparatus of any of Embodiments 30-32, wherein: each of the second training fields includes a respective third OFDM symbol having a third duration shorter than the first duration.

Embodiment 34

The apparatus of Embodiment 33, wherein: the third duration is equal to the second duration.

Embodiment 35

The apparatus of any of Embodiments 30-34, wherein the one or more IC devices are further configured to: analyze information in the PHY preamble to determine the second duration of each second OFDM symbol in the one or more third training fields in the PHY midamble; and process the one or more third training fields according to the determined second duration.

Embodiment 36

The apparatus of any of Embodiments 30-35, wherein: a respective first guard interval (GI) corresponds to each third OFDM symbol of the one or more second training fields in the PHY preamble; a respective second GI corresponds to each second OFDM symbol of the one or more third training fields in the PHY midamble; and the one or more IC devices are further configured to: analyze information in the PHY preamble to determine a duration of each second GI corresponding to each second OFDM symbol of the one or more third training fields in the PHY midamble, and process the one or more third training fields according to the determined duration of each second GI.

Embodiment 37

The apparatus of Embodiment 36, wherein: a duration of each first GI is different than the duration of each second GI.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, one or more integrated circuits (ICs), an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for wireless communication, the method comprising:
generating, at a communication device, a physical layer (PHY) preamble of a PHY protocol data unit, wherein the PHY preamble is generated to include i) a first training field to be used by a receiver for synchronization, and ii) one or more second training fields to be used by the receiver for channel estimation and fine synchronization, wherein each of the second training fields includes a respective first orthogonal frequency division multiplexing (OFDM) symbol, and wherein generating the PHY preamble includes inserting a respective first guard interval (GI) corresponding to each first OFDM symbol of the one or more second training fields;
generating, at the communication device, i) a first portion of a PHY data payload of the PHY protocol unit, and ii) a second portion of the PHY data payload of the PHY protocol data unit, wherein the first portion of the PHY data payload and the second portion of the PHY data payload include a plurality of second OFDM symbols, wherein each of multiple second OFDM symbols among the plurality of second OFDM symbols has a first duration; and
generating, at the communication device, a PHY midamble of the PHY protocol data unit, wherein:
the PHY midamble is to be transmitted subsequent to transmission of the first portion of the PHY data payload and prior to transmission of the second portion of the PHY data payload,
the PHY midamble is generated to include one or more third training fields to be used by the receiver for channel estimation and fine synchronization,
each of the third training fields includes a respective third OFDM symbol having a second duration shorter than the first duration, and
generating the PHY midamble includes inserting a respective second GI corresponding to each third OFDM symbol, wherein a duration of each first GI is equal to a duration of each second GI.

2. The method of claim 1, wherein:
each third OFDM symbol corresponds to a respective frequency domain sequence corresponding to a plurality of tones,
every L-th tone is modulated and tones between modulated tones are zero tones,
L is a positive integer greater than one, and
a time duration of each third OFDM symbol is 1/L of a time duration of a full inverse discrete Fourier transform (IDFT) of the respective frequency domain sequence.

3. The method of claim 2, wherein generating each third OFDM symbol includes:
performing, at the communication device, an IDFT of the respective frequency domain sequence of the third OFDM symbol to generate at least a first 1/L portion of a time-domain sequence corresponding to the full IDFT of the frequency domain sequence.

4. The method of claim 3, wherein generating each third OFDM symbol includes:
truncating, at the communication device, a time-domain sequence corresponding to the full IDFT of the frequency domain sequence to the first 1/L portion of the time-domain sequence corresponding to the full IDFT of the frequency domain sequence.

5. The method of claim 2, wherein:
L is 4 when a first training field compression mode is used to generate each second OFDM symbol; and
L is 2 when a second training field compression mode is used to generate each second OFDM symbol.

6. The method of claim 1, wherein:
each respective first OFDM symbol of the second training fields has a third duration that is shorter than the first duration.

7. The method of claim 6, wherein:
the third duration is equal to the second duration.

8. The method of claim 1, further comprising:
generating, at the communication device, a plurality of PHY midambles of the PHY protocol data unit;
including, at the communication device, the plurality of PHY midambles in the PHY protocol data unit such that the PHY protocol data unit includes N OFDM symbols corresponding to the PHY data payload between adjacent PHY midambles, wherein N is a positive integer less than 1000; and
determining, at the communication device, N based on conditions of a communication channel via which the PHY protocol data unit is to be transmitted.

9. An apparatus, comprising:
a network interface device having one or more integrated circuit (IC) devices configured to:
generate a physical layer (PHY) preamble of a PHY protocol data unit, wherein the PHY preamble is generated to include i) a first training field to be used by a receiver for synchronization, and ii) one or more second training fields to be used by the receiver for channel estimation and fine synchronization, wherein each of the second training fields includes a respective first orthogonal frequency division multiplexing (OFDM) symbol, and wherein generating the PHY preamble includes inserting a respective first guard interval (GI) corresponding to each first OFDM symbol of the one or more second training fields,
generate i) a first portion of a PHY data payload of the PHY protocol unit, and ii) a second portion of the PHY data payload of the PHY protocol data unit, wherein the first portion of the PHY data payload and the second portion of the PHY data payload include a plurality of second OFDM symbols, wherein each of multiple second OFDM symbols among the plurality of second OFDM symbols has a first duration, and
generate a PHY midamble of the PHY protocol data unit, wherein:
the PHY midamble is to be transmitted subsequent to transmission of the first portion of the PHY data payload and prior to transmission of the second portion of the PHY data payload,
the PHY midamble is generated to include one or more third training fields to be used by the receiver for channel estimation and fine synchronization,
each of the third training fields includes a respective third OFDM symbol having a second duration shorter than the first duration, and
generating the PHY midamble includes inserting a respective second GI corresponding to each third OFDM symbol, wherein a duration of each first GI is equal to a duration of each second GI.

10. The apparatus of claim 9, wherein:
each third OFDM symbol corresponds to a respective frequency domain sequence corresponding to a plurality of tones,
every L-th tone is modulated and tones between modulated tones are zero tones, wherein L is a positive integer greater than one, and
a time duration of each third OFDM symbol is 1/L of a time duration of a full inverse discrete Fourier transform (IDFT) of the respective frequency domain sequence.

11. The apparatus of claim 10, wherein the one or more IC devices are further configured to:
perform an IDFT of the respective frequency domain sequence of the third OFDM symbol to generate at least a first 1/L portion of a time-domain sequence corresponding to the full IDFT of the frequency domain sequence.

12. The apparatus of claim 11, wherein the one or more IC devices are further configured to:
truncate a time-domain sequence corresponding to the full IDFT of the frequency domain sequence to the first 1/L portion of the time-domain sequence corresponding to the full IDFT of the frequency domain sequence.

13. The apparatus of claim 10, wherein:
L is 4 when a first training field compression mode is used to generate each second OFDM symbol; and
L is 2 when a second training field compression mode is used to generate each second OFDM symbol.

14. The apparatus of claim 9, wherein:
each respective first OFDM symbol of the second training fields has a third duration that is shorter than the first duration.

15. The apparatus of claim 14, wherein:
the third duration is equal to the second duration.

16. The apparatus of claim 9, wherein the one or more IC devices are further configured to:
generate a plurality of PHY midambles of the PHY protocol data unit;
include the plurality of PHY midambles in the PHY protocol data unit such that the PHY protocol data unit includes N OFDM symbols corresponding to the PHY data payload between adjacent PHY midambles, wherein N is a positive integer less than 1000; and
determine N based on conditions of a communication channel via which the PHY protocol data unit is to be transmitted.

17. The apparatus of claim 9, wherein the network interface device comprises:
a media access control (MAC) processing unit implemented on the one or more IC devices; and
a PHY processing unit implemented on the one or more IC devices and coupled to the MAC processing unit.

* * * * *